US009172939B2

(12) United States Patent
Corral-Soto

(10) Patent No.: US 9,172,939 B2
(45) Date of Patent: Oct. 27, 2015

(54) SYSTEM AND METHOD FOR ADJUSTING PERCEIVED DEPTH OF STEREOSCOPIC IMAGES

(75) Inventor: Eduardo R. Corral-Soto, Toronto (CA)

(73) Assignee: STMicroelectronics (CANADA), Inc., Ottawa, CA (US)

( * ) Notice: Subject to any disclaimer, the term of this patent is extended or adjusted under 35 U.S.C. 154(b) by 972 days.

(21) Appl. No.: 13/341,001

(22) Filed: Dec. 30, 2011

(65) Prior Publication Data

US 2013/0169748 A1 Jul. 4, 2013

(51) Int. Cl.
*H04N 13/00* (2006.01)
*G06K 9/00* (2006.01)

(52) U.S. Cl.
CPC ....... *H04N 13/0011* (2013.01); *H04N 13/0022* (2013.01); *H04N 2013/0081* (2013.01)

(58) Field of Classification Search
None
See application file for complete search history.

(56) References Cited

U.S. PATENT DOCUMENTS

| 6,301,377 | B1 * | 10/2001 | Taylor, Jr. ...................... 382/129 |
| 7,944,444 | B2 * | 5/2011 | Ha et al. ......................... 345/427 |
| 2007/0236514 | A1 * | 10/2007 | Agusanto et al. ............. 345/646 |
| 2010/0166319 | A1 * | 7/2010 | Zhang ............................ 382/201 |
| 2011/0285826 | A1 * | 11/2011 | Bickerstaff et al. ............. 348/47 |
| 2012/0062548 | A1 * | 3/2012 | Pan et al. ........................ 345/419 |
| 2012/0113093 | A1 * | 5/2012 | Liao et al. ..................... 345/419 |

\* cited by examiner

*Primary Examiner* — Kate Luo
(74) *Attorney, Agent, or Firm* — Gardere Wynne Sewell LLP

(57) ABSTRACT

A system and method for adjusting the perceived depth of stereoscopic images are provided. The system includes a disparity estimator, a disparity processor and a warping engine. The disparity estimator is configured to receive a stereoscopic image, to estimate disparities in the stereoscopic image, and to generate an estimator signal comprising the estimated disparities. The disparity processor is configured to receive the estimator signal from the disparity estimator and a depth control signal that is generated based on a user input. The disparity processor is also configured to generate a processor signal based on the estimator signal and the depth control signal. The warping engine is configured to receive the processor signal and to generate an adjusted stereoscopic image by warping the processor signal based on a model.

21 Claims, 4 Drawing Sheets

SYSTEM AND METHOD FOR ADJUSTING PERCEIVED DEPTH OF STEREOSCOPIC IMAGES

TECHNICAL FIELD

The present disclosure is directed, in general, to image processing, and more specifically, to a system and method for adjusting the perceived depth of stereoscopic images.

BACKGROUND

When a stereoscopic three-dimensional (3D) video is created, two different views of the scene are either captured by physical stereoscopic cameras or artificially generated by means of computer graphics. Typically, the distance between the cameras, which is known as the baseline, is kept fixed during production according to the 3D visual effects desired by the film maker. Therefore, at the time of viewing the 3D video by wearing active or passive glasses, a viewer will experience a default depth perception effect as planned by the film/video maker.

However, this default depth perception can be perceived significantly differently for different viewers. For example, the default depth may be too strong for some children or too weak for some adults or it can cause eye strain and/or headaches for some viewers. Also, if a 3D television with an optimal viewing distance of three meters, for example, is located in a small room such that the viewer is unable to move three meters away from the television, the 3D effect experienced by the viewer might be compromised and/or eye strain may occur.

SUMMARY

A system for adjusting the perceived depth of a stereoscopic image includes a disparity estimator, a disparity processor and a warping engine. The disparity estimator is configured to receive a stereoscopic image, to estimate disparities in the stereoscopic image, and to generate an estimator signal comprising the estimated disparities. The disparity processor is configured to receive the estimator signal from the disparity estimator and a depth control signal that is generated based on a user input. The disparity processor is also configured to generate a processor signal based on the estimator signal and the depth control signal. The warping engine is configured to receive the processor signal and to generate an adjusted stereoscopic image by warping the processor signal based on a model.

A method for adjusting the perceived depth of a stereoscopic image includes estimating disparities in a stereoscopic image. A processor signal is generated based on the estimated disparities and based on a depth control signal that is generated based on a user input. The processor signal comprises a plurality of unwarped patches. The processor signal is warped based on a model to generate warped patches based on the unwarped patches. An adjusted stereoscopic image is generated based on the warped patches.

A tangible computer-readable storage medium is encoded with computer-executable instructions that, when executed, cause a video depth controller to estimate disparities in a stereoscopic image, to generate a processor signal based on the estimated disparities and based on a depth control signal that is generated based on a user input, to warp the processor signal based on a model to generate warped patches, and to generate an adjusted stereoscopic image based on the warped patches.

Other technical features may be readily apparent to one skilled in the art from the following figures, descriptions and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
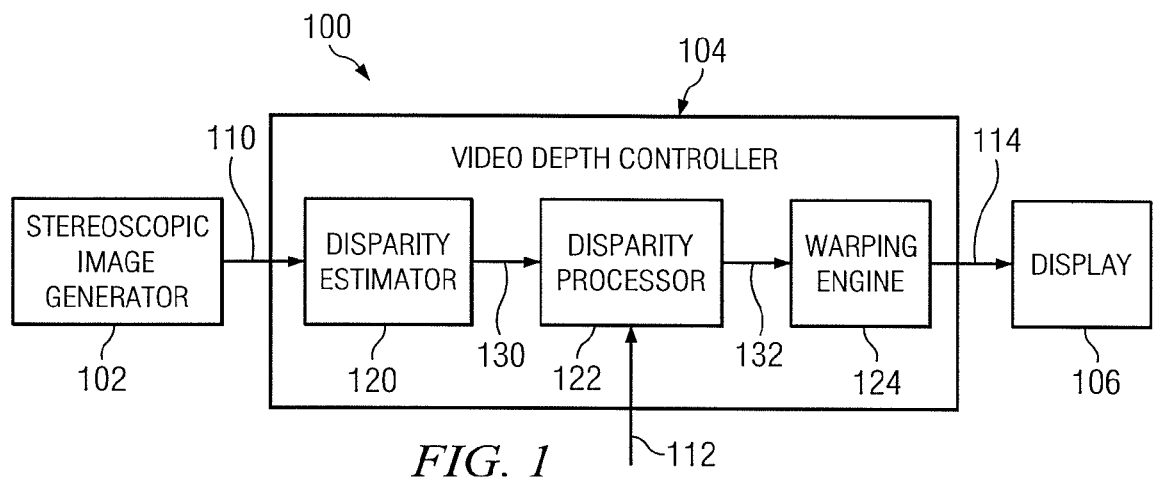
FIG. 1 illustrates a system for adjusting the perceived depth of stereoscopic images in accordance with the present disclosure.

FIG. 1 illustrates a system 100 for adjusting the perceived depth of stereoscopic images in accordance with the present disclosure. The embodiment of the system 100 shown in FIG. 1 is for illustration only. Other embodiments of the system 100 could be used without departing from the scope of this disclosure.

The system 100 comprises a stereoscopic image generator 102, a video depth controller 104 and a display 106. The stereoscopic image generator 102 may comprise a 3D Blu-ray player or other suitable device configured to generate stereoscopic images 110, such as 3D movies. Each stereoscopic image 110 comprises a left stereoscopic image and a right stereoscopic image. The video depth controller 104 is configured to adjust the perceived depth of the stereoscopic image 110 generated by the stereoscopic image generator 102 in accordance with a depth control signal 112 provided by a user of the system 100 in order to generate an adjusted stereoscopic image 114. Each adjusted stereoscopic image 114 comprises a left adjusted stereoscopic image and a right adjusted stereoscopic image. The display 106, which may comprise a 3D television or other suitable device capable of displaying 3D images, is configured to display the adjusted stereoscopic image 114 generated by the video depth controller 104.

For the illustrated embodiment, the video depth controller 104 comprises a disparity estimator 120, a disparity processor 122 and a warping engine 124. The disparity estimator 120 is configured to receive the stereoscopic image 110 from the stereoscopic image generator 102 and to generate an estimator signal 130 based on the stereoscopic image 110. The estimator signal 130 comprises disparities in the stereoscopic image 110 estimated by the disparity estimator 120. For example, in generating the estimator signal 130, the disparity estimator 120 may compute stereo correspondences between the left stereoscopic image and the right stereoscopic image.

For some embodiments, the disparity estimator 120 may comprise a motion estimator that is configured to compute the disparities in the stereoscopic images 110. For example, for some embodiments, the disparities may be effectively the horizontal component of the vectors computed from a stereoscopic image pair, i.e., the left and right stereoscopic images. The disparity estimator 120 may be configured to compute two disparity fields: L-to-R (from left to right) and R-to-L (from right to left). The disparity estimator 120 may also be configured to spatially decimate the computed disparity fields.

For some embodiments, the input stereoscopic image 110 may be rectified by an epipolar rectification mechanism in order to emulate aligned stereo cameras to simplify the matching process. For example, an epipolar rectifier may be included as part of the stereoscopic image generator 102 or between the stereoscopic image generator 102 and the video depth controller 104. Alternatively, the video depth controller 104 may comprise an epipolar rectifier to rectify the stereoscopic image 110 before it is provided to the disparity estimator 120. For other embodiments, the stereoscopic image 110 may be captured by a standard stereo camera rig in which the cameras' optical axes are parallel such that the stereoscopic image 110 is already rectified.

The disparity processor 122 is configured to receive the estimator signal 130 from the disparity estimator 120 and to receive the depth control signal 112 based on a user input. The disparity processor 122 is also configured to generate a processor signal 132 based on the estimator signal 130 and the depth control signal 112. For example, in generating the processor signal 130, the disparity processor 122 may perform conditioning of the computed disparities in the estimator signal 130 based on the depth control signal 112, which may control the type and amount of change in the depth perceived by the user.

For some embodiments, after the disparities are computed by the disparity estimator 120, the disparity processor 122 is configured to apply an adaptive two-dimensional (2D) filtering mechanism to the computed disparities. For example, the disparity estimator 122 may use a bank of 2D filters with different shapes in order to filter the decimated disparity arrays adaptively depending upon the local structure of the disparities. For this example, a structure analysis stage of the disparity processor 122 may be used to select a particular filter according to the local characteristics of the disparities region. This adaptive filtering mechanism may be designed to fill in the existing occlusion areas in the disparity array while minimizing distortions on the adjusted stereoscopic image 114. After filtering, the disparity processor 122 is also configured to up-scale the disparity fields to the original image dimensions.

For some embodiments, based on the depth control signal 112, the actual values of the disparities may be adjusted in two ways. First, the disparities may be multiplied by a baseline scaling factor that has a range comprising both negative and positive values (including zero). Second, a horizontal translation offset (either negative or positive) may be added to the disparities. Thus, for these embodiments, the depth control signal 112 may comprise the baseline scaling factor and/or the horizontal translation offset. These two adjustments enable the user to adjust the perceived depth when viewing the final 3D outputs, i.e., the adjusted stereoscopic image 114.

The warping engine 124 is configured to receive the processor signal 132 and generate the adjusted stereoscopic image 114 based on the processor signal 132. For example, the warping engine 124 may warp the processor signal 132 and perform interpolation in order to synthesize the adjusted stereoscopic image 114. As described in more detail below, the warping engine 124 may comprise a model-based warping engine.

For some embodiments, after the disparity processor 122 adjusts the values of the disparities by the baseline scaling factor and/or the horizontal translation adjustment provided in the depth control signal 112, the warping engine 124 is configured to synthesize an adjusted stereoscopic image 114. Thus, for these embodiments, the warping engine 124 may be configured based on transformation models that are used to model how a small region of an input image is mapped onto an equivalent region in the warped image, which is the adjusted stereoscopic image 114.

Although FIG. 1 illustrates one example of a system 100 for adjusting the perceived depth of stereoscopic images 110, various changes may be made to FIG. 1. For example, the makeup and arrangement of the system 100 are for illustration only. Components could be added, omitted, combined, subdivided, or placed in any other suitable configuration according to particular needs. For example, the video depth controller 104 may be implemented as a component of the stereoscopic image generator 102 or as a component of the display 106. Alternatively, parts of the video depth controller 104 may be implemented in the stereoscopic image generator 102 and/or parts of the video depth controller 104 may be implemented in the display 106. Furthermore, the depth control signal 112 provided by the user may be provided directly to the video depth controller 104 as illustrated or, alternatively, may be provided indirectly through any other suitable component, including either the stereoscopic image generator 102 or the display 106.

In addition, FIG. 1 illustrates one environment in which the video depth controller 104 may be implemented. However, the video depth controller 104 may be used in any other suitable system without departing from the scope of this disclosure.

Figure 2:
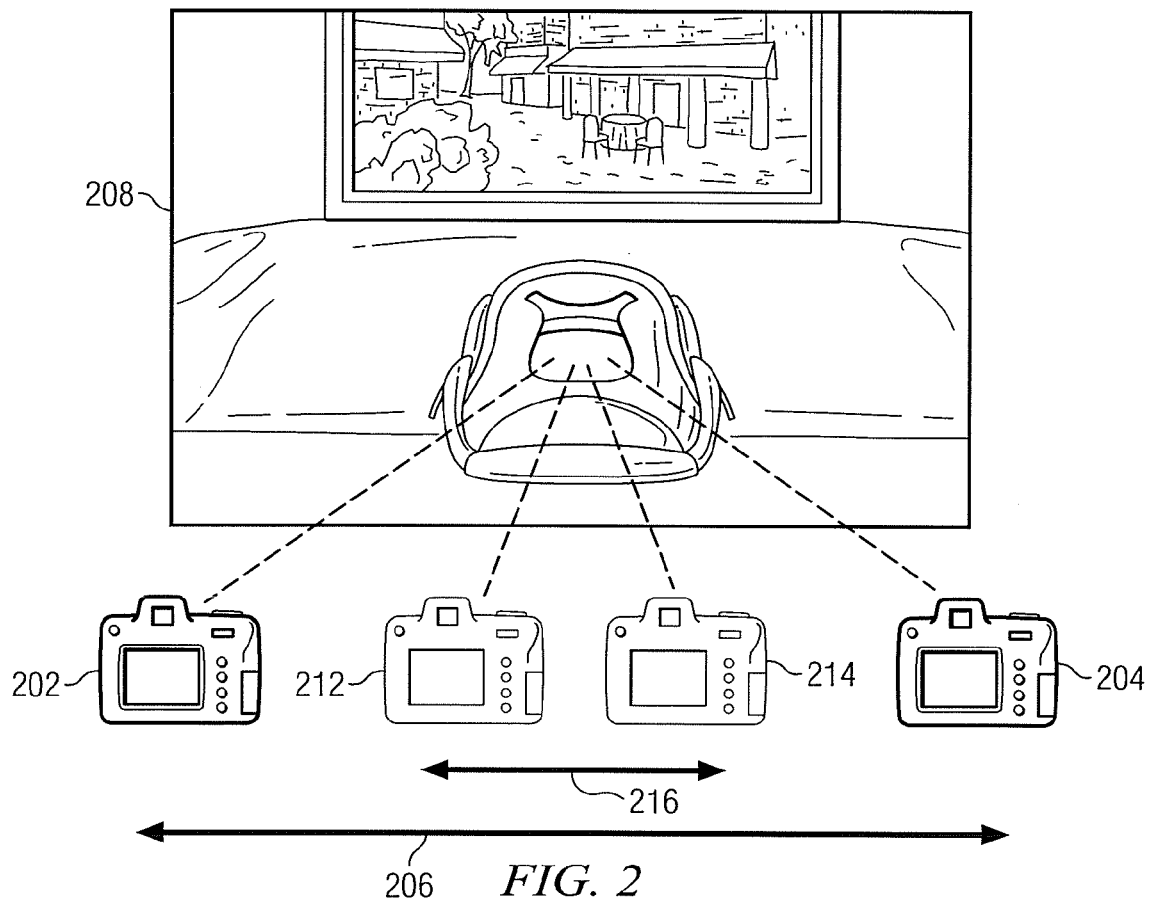
FIG. 2 illustrates the generation of a stereoscopic image and an adjusted stereoscopic image based on an actual scene in accordance with the present disclosure.

FIG. 2 illustrates an example of the generation of a stereoscopic image 110 and an adjusted stereoscopic image 114 based on an actual scene in accordance with the present disclosure. For the illustrated example, two actual cameras, a left actual camera 202 and a right actual camera 204, are separated by a distance known as a baseline 206. The left actual camera 202 is capable of capturing an image of an actual three-dimensional scene 208 from an angle to the left of the center of the scene 208, while the right actual camera 204 is capable of capturing an image of the scene 208 from an angle to the right of the center of the scene 208.

A 3D stereoscopic image, such as the stereoscopic image 110, may be generated based on the images captured by the actual cameras 202 and 204. The perceived depth of the generated stereoscopic image 110 is determined by the distance of the baseline 206. Because of this, the baseline 206 is typically chosen to correspond to the inter-ocular distance of an average adult, which is about 6.5 mm.

However, the perceived depth changes if the baseline 206 changes. As a result, two virtual cameras, a left virtual camera 212 and a right virtual camera 214, which are separated by a virtual baseline 216 different from the actual baseline 206, may be used to generate an adjusted 3D stereoscopic image, such as the adjusted stereoscopic image 114.

Figure 3:
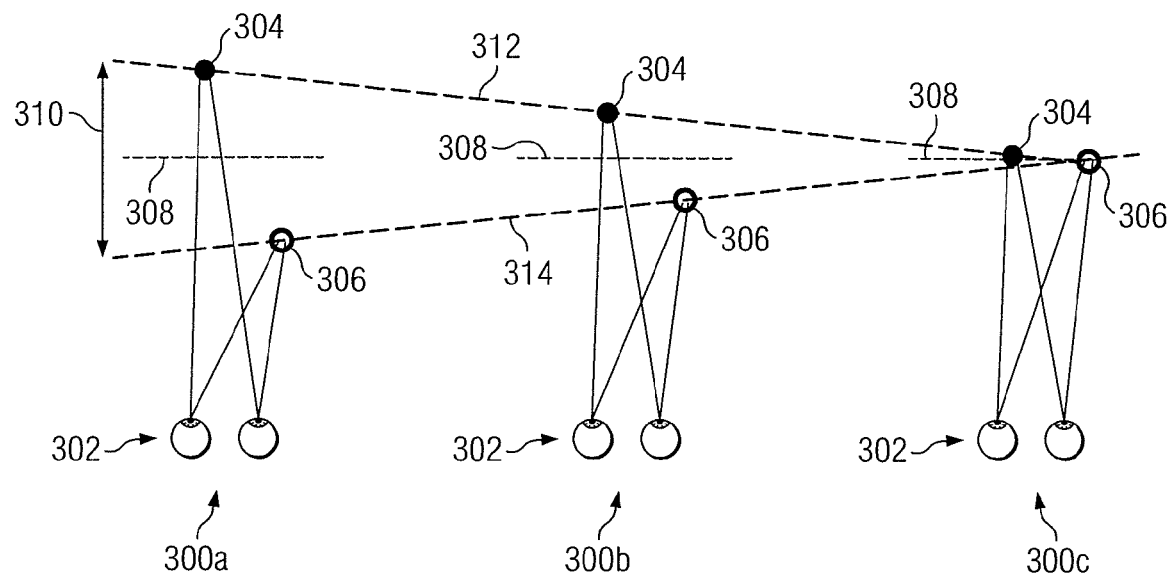
FIG. 3 illustrates the adjustment of a perceived depth of a stereoscopic image by adjusting a baseline in accordance with the present disclosure.

FIG. 3 illustrates the adjustment of a perceived depth of a stereoscopic image 110 by adjusting a baseline 206 in accordance with the present disclosure. For example, an adjusted stereoscopic image 114 of an actual three-dimensional scene 208 may be generated based on a stereoscopic image 110 of the scene 208 by virtually adjusting the baseline 206 of the stereoscopic image 110 to a different, virtual baseline 216.

A plurality of views 300a-c are shown in FIG. 3 as examples of the adjustment of perceived depth for a viewer 302, illustrated as a pair of eyes, of a particular scene including a first object 304 and a second object 306. The first object 304 is located farther away from the viewer 302 than the second object 306 when the scene is perceived as three-dimensional. A dotted line 308 represents the location of a display, such as the display 106, on which the adjusted stereoscopic image 114 is displayed for the viewer 302.

A depth range 310 of the scene for each of the views 300a-c may be defined by a far line 312 and a near line 314. The far line 312 corresponds to a point in the scene that is the farthest away from the viewer 302, and the near line 314 corresponds to a point in the scene that is nearest to the viewer 302. Thus, for the illustrated embodiment, the first object 304 is located at the farthest point in the scene away from the viewer 302 and the second object 306 is located at the closest point in the scene to the viewer 302.

In the first view 300a, the depth range 310 is relatively large, producing a perceived depth for the viewer 302 that is relatively strong as compared to the other views 300b-c. In the second view 300b, the depth range 310 is smaller as compared to the first view 300a, producing a perceived depth for the viewer 302 that is weaker than the first view 300a. In the third view 300c, the depth range 310 is smaller as compared to the second view 300b, producing a perceived depth for the viewer 302 that is even weaker than the second view 300b. For the third view 300c, the scene would appear nearly two-dimensional to the viewer 302. By modifying the depth control signal 112, the viewer 302 may adjust the depth range 310 along the lines 312 and 314 until a desired strength for the perceived depth of the adjusted stereoscopic image 114 is achieved.

Figure 4:
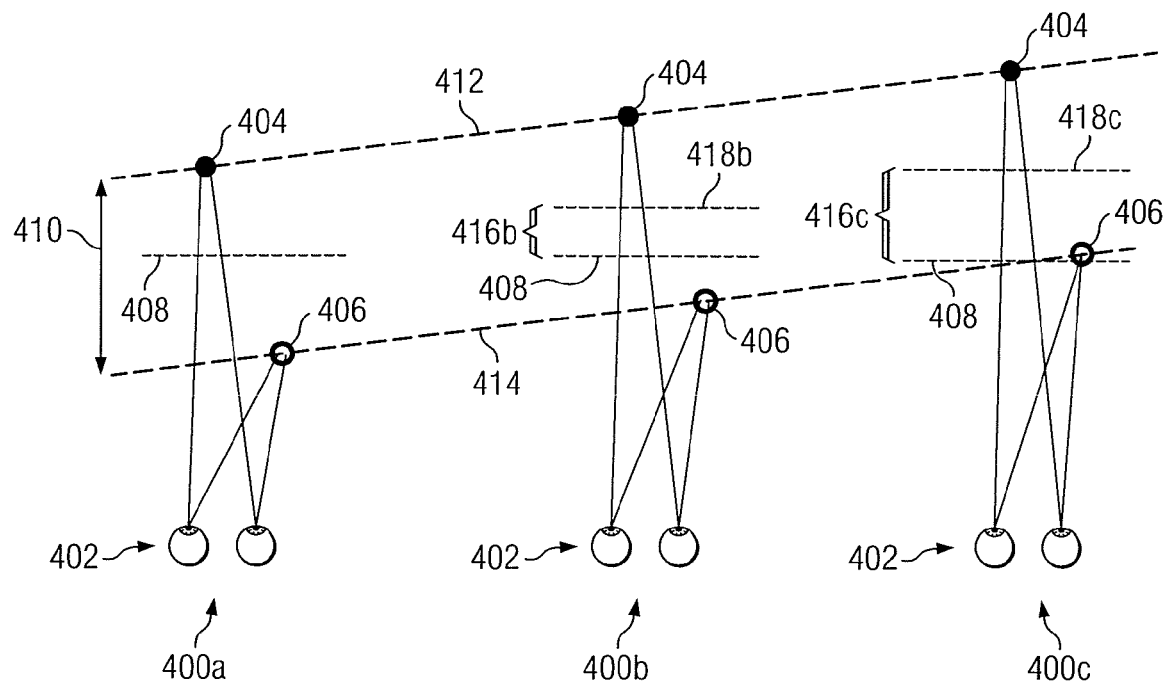
FIG. 4 illustrates the adjustment of a perceived depth of a stereoscopic image by horizontal image translation in accordance with the present disclosure.

FIG. 4 illustrates the adjustment of a perceived depth of a stereoscopic image 110 by horizontal image translation in accordance with the present disclosure. A plurality of views 400a-c are shown in FIG. 4 as examples of the adjustment of perceived depth for a viewer 402, illustrated as a pair of eyes, of a particular scene including a first object 404 and a second object 406. The first object 404 is located farther away from the viewer 402 than the second object 406 when the scene is perceived as three-dimensional. A dotted line 408 represents the location of a display, such as the display 106, on which the adjusted stereoscopic image 114 is displayed for the viewer 402.

A depth range 410 of the scene for each of the views 400a-c may be defined by a far line 412 and a near line 414. The far line 412 corresponds to a point in the scene that is the farthest away from the viewer 402, and the near line 414 corresponds to a point in the scene that is nearest to the viewer 402. Thus, for the illustrated embodiment, the first object 404 is located at the farthest point in the scene away from the viewer 402 and the second object 406 is located at the closest point in the scene to the viewer 402.

For the example illustrated in FIG. 4, the depth range 410 does not change. Instead, the entire scene is shifted back away from the viewer 402 or closer to the viewer 402. Thus, in the first view 400a, the objects 404 and 406 are relatively close to the viewer 402 as compared to the other views 400b-c. In the second view 400b, the objects 404 and 406 are farther away from the viewer 402 as compared to the first view 400a. In the third view 400c, the objects 404 and 406 are farther away from the viewer 402 as compared to the second view 400b.

For this example, the first view 400a corresponds to an unmodified view of the scene with respect to horizontal image translation. Thus, with respect to the three-dimensional aspect of the scene, the scene appears to be centered at the display line 408. The second view 400b corresponds to a horizontal translation of the scene by a horizontal translation adjustment 416b such that the scene appears to be centered at a virtual display line 418b instead of the actual display line 408. The third view 400c corresponds to a horizontal translation of the scene by a horizontal translation adjustment 416c that is larger than the horizontal translation adjustment 416b such that the scene appears to be centered at a virtual display line 418c that is even farther away from the viewer 402 than the virtual display line 418b.

It will be understood that a horizontal translation adjustment 416 may be made toward the viewer 402, thus bringing the scene closer to the viewer 402 instead of moving the scene farther away. Therefore, by modifying the depth control signal 112, the viewer 402 may adjust the perceived depth of the entire scene until a desired virtual display line 418 is achieved for the adjusted stereoscopic image 114.

In addition, for some embodiments, the depth control signal 112 may provide an adjustment of the strength of the perceived depth as described with respect to FIG. 3 (i.e., a baseline adjustment), in addition to a horizontal translation adjustment. For these embodiments, the depth control signal 112 may comprise either a single signal or multiple signals. For example, a first depth control signal may provide a baseline adjustment, while a second depth control signal may provide a horizontal translation adjustment.

Figure 5:
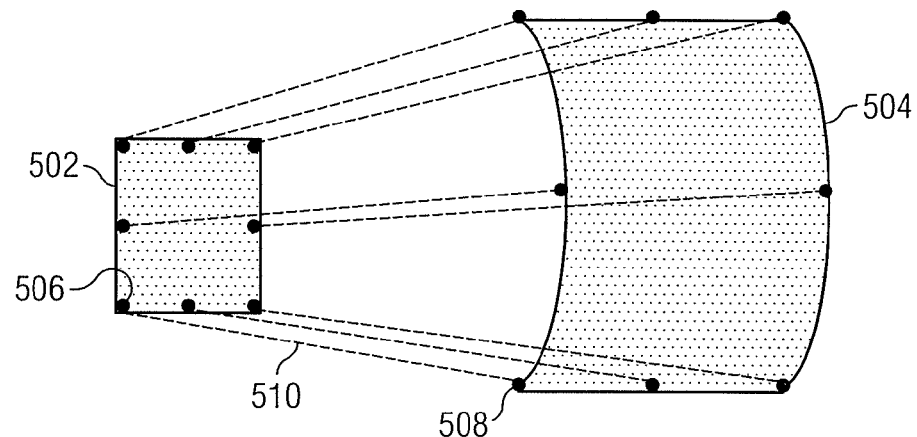
FIG. 5 illustrates the warping operation of the warping engine of FIG. 1 in accordance with the present disclosure.

FIG. 5 illustrates the warping operation of the warping engine 124 in accordance with the present disclosure. For this embodiment, an unwarped patch 502 of an image is warped by the warping engine 124 into a warped patch 504. For example, the unwarped patch 502 may be part of an image defined by the processor signal 132, and the warped patch 504 may be part of an image defined by the adjusted stereoscopic image 114.

The unwarped patch 502 comprises a plurality of points, such as the point 506. Although the illustrated example shows eight points, it will be understood that the entire unwarped patch 502 may be formed from many points, or pixels, that are not explicitly illustrated in FIG. 5. Based on the warping performed by the warping engine 124, the point 506 may be mapped to the point 508 in the warped patch 504. The warping engine 124 similarly maps each point in the unwarped patch 502 onto a corresponding point in the warped patch 504 in order to generate the warped patch 504. Each dotted line, such as the dotted line 510, symbolizes a pixel correspondence between the unwarped patch 502 and the warped patch 504.

If $\vec{p}$ is a point in the unwarped patch 502, the warping engine 124 may obtain a transformed point $\vec{q}$ in the warped patch 504 by applying a transformation function as follows:

$$\vec{q} = T[\vec{p}]$$

The transformation function, T, comprises a model with associated parameters. For some embodiments, the model may be a $2^{nd}$-degree polynomial (conic) model in x and y. For some other embodiments, the model may be an affine model. Either of these models may be used for cases in which the disparities estimated by the disparity estimator 120 have both vertical and horizontal components (i.e., for cases in which the input stereoscopic image 110 is not aligned or pre-rectified). In addition, for some embodiments, these models may comprise six-parameter models.

Figure 6:
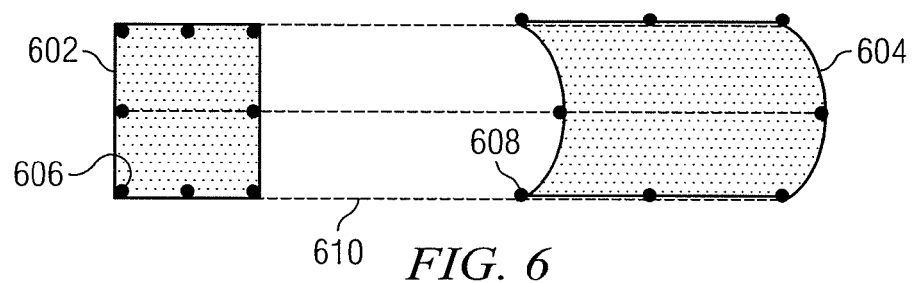
FIG. 6 illustrates the warping operation of the warping engine of FIG. 1 in accordance other embodiments of the present disclosure.

FIG. 6 illustrates the warping operation of the warping engine 124 in accordance other embodiments of the present disclosure. For this embodiment, an unwarped patch 602 of an image is warped by the warping engine 124 into a warped patch 604. For example, the unwarped patch 602 may be part of an image defined by the processor signal 132, and the warped patch 604 may be part of an image defined by the adjusted stereoscopic image 114.

The unwarped patch 602 comprises a plurality of points, such as the point 606. Although the illustrated example shows eight points, it will be understood that the entire unwarped patch 602 may be formed from many points, or pixels, that are not explicitly illustrated in FIG. 6. Based on the warping performed by the warping engine 124, the point 606 may be mapped to the point 608 in the warped patch 604. The warping engine 124 similarly maps each point in the unwarped patch 602 onto a corresponding point in the warped patch 604 in order to generate the warped patch 604. Each dotted line, such as the dotted line 610, symbolizes a pixel correspondence between the unwarped patch 602 and the warped patch 604.

If $\vec{p}$ is a point in the unwarped patch 602, the warping engine 124 may obtain a transformed point $\vec{q}$ in the warped patch 604 by applying a transformation function as follows:

$$\vec{q} = T[\vec{p}].$$

The transformation function, T, comprises a model with associated parameters. For embodiments in which the disparities estimated by the disparity estimator 120 have only horizontal components (i.e., the vertical component is zero), the model may comprise a simplified affine model.

Thus, for the specific case in which the vertical component of the disparities is zero (i.e., for cases in which the input stereoscopic image 110 is aligned or pre-rectified), the warping engine 124 may implement the following simplified, three-parameter version of the affine transformation:

$$H = \begin{bmatrix} a & b & c \\ 0 & 1 & 0 \\ 0 & 0 & 1 \end{bmatrix}.$$

As shown in FIG. 6, in this case, the warping effect provided by the warping engine 124 occurs only in the horizontal direction.

For the embodiments illustrated in FIG. 5 and FIG. 6, the warping engine 124 is configured to use a transformation model in order to determine the approximate distortion or warping of intermediate image points that lie within the warped patches 504 and 604. The warping engine 124 may determine the warping by making use of a number of image correspondences (e.g., in the form of stereo disparities) in order to estimate the model parameters (i.e., a, b, c, d, e and f for the $2^{nd}$-degree and affine models corresponding to FIG. 5 and a, b and c for the simplified horizontal affine model corresponding to FIG. 6). For some embodiments, the warping engine 124 is configured to use standard statistical methods to solve for these model parameters, such as Least-Squares/Maximum Likelihood Estimation or other suitable method.

Figure 7:
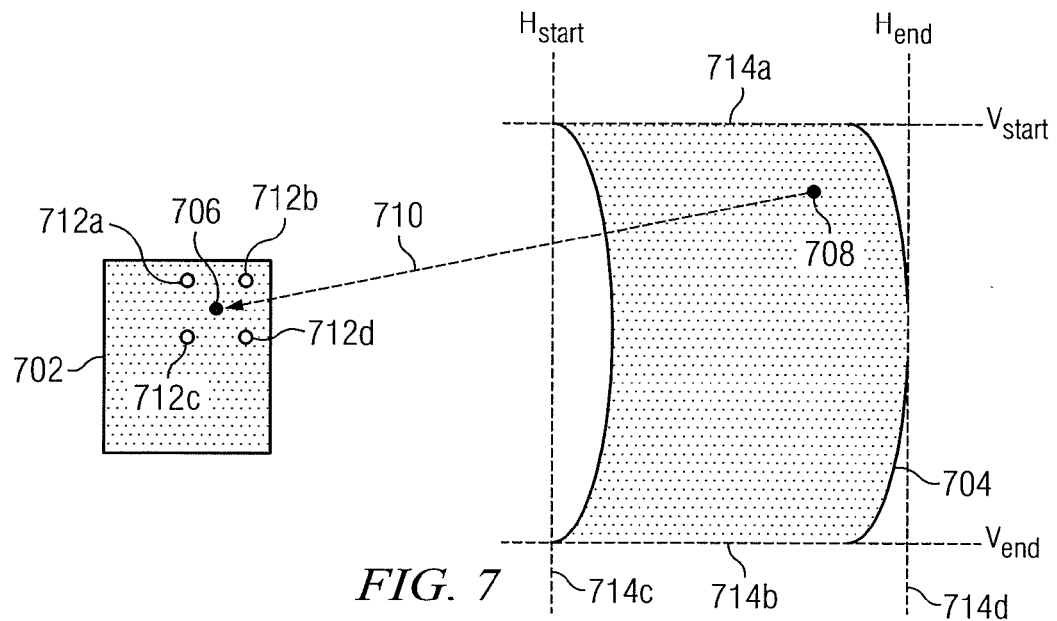
FIG. 7 illustrates color mapping by the warping engine of FIG. 1 in accordance with the present disclosure.

FIG. 7 illustrates color mapping by the warping engine 124 in accordance with the present disclosure. Similar to FIGS. 5 and 6, an unwarped patch 702 of an image is warped by the warping engine 124 into a warped patch 704. For example, the unwarped patch 702 may be part of an image defined by the processor signal 132, and the warped patch 704 may be part of an image defined by the adjusted stereoscopic image 114.

The unwarped patch 702 comprises a plurality of points, such as the point 706, and the warped patch 704 comprises a plurality of points, such as the point 708. The dotted line 710 symbolizes a pixel correspondence between the unwarped patch 702 and the warped patch 704.

After the warping engine 124 has computed the model parameters, as described above with reference to FIGS. 5 and 6, the warping engine 124 is configured to map any point $\vec{q}$ from the warped patch 704 onto a point $\vec{p}$ that lies within the unwarped patch 702. Because the components of $\vec{q}$ are integers, $\vec{p}$ may have fractional components.

After the mapping engine 124 maps a point $\vec{q}$ to $\vec{p}$, such as the point 708 to 706, the mapping engine 124 is configured to determine a color/intensity value for filling in the location $\vec{q}$ (e.g., the point 708) of the warped patch 704. For some embodiments, the warping engine 124 may perform this filling process by means of a 2D interpolation scheme, such as bilinear or bicubic interpolation.

Since $\vec{p}$ may have fractional components, a set of the nearest integer neighbors in the unwarped patch 702 may be used to produce an interpolated value to be inserted into the integer location $\vec{q}$ in the warped patch 704. For example, for the illustrated point 706, a set of the four nearest integer neighbors 712a-d may be used to determine a color for filling in the point 708 in the warped patch 704.

The warping engine 124 may be configured to perform this filling process for each of the pixels in the warped patch 704. For some embodiments, the warping engine 124 may perform the filling process by filling in a rectangle defined by the four dashed lines 714a-d shown in FIG. 7. The rectangle may also be defined by the points labeled $V_{start}$, $V_{end}$, $H_{start}$ and $H_{end}$. Multiple filling may be dealt with by either taking no action or taking the average of the filled values.

Because the warping engine 124 described above is a model-based warping engine, the warping engine 124 provides model scalability. For example, the model used may be simplified to the case where only one parameter (such as translation) is used.

Figure 8:
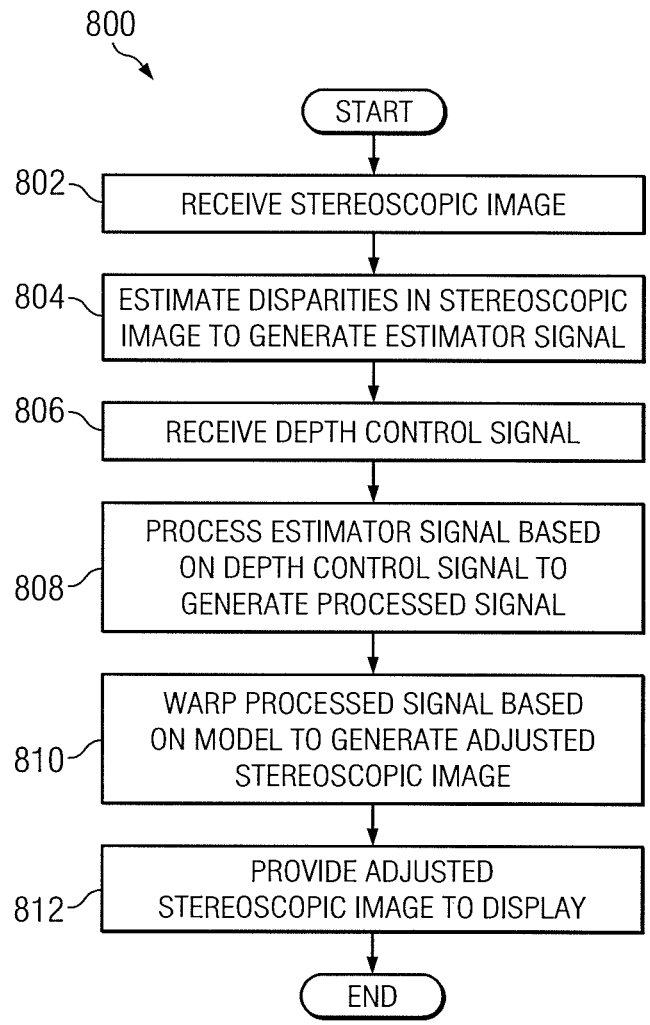
FIG. 8 illustrates a method for adjusting the perceived depth of stereoscopic images using the video depth controller of FIG. 1 in accordance with the present disclosure.

FIG. 8 illustrates a method 800 for adjusting the perceived depth of stereoscopic images 110 using the video depth controller 104 in accordance with the present disclosure. The method 800 shown in FIG. 8 is for illustration only. The stereoscopic images 110 may be adjusted in any other suitable manner without departing from the scope of this disclosure.

The method 800 begins with the disparity estimator 120 receiving a stereoscopic image 110 from a stereoscopic image generator 102 (step 802). The stereoscopic image 110 comprises a left stereoscopic image and a right stereoscopic image. For some embodiments, the left and right stereoscopic images are rectified, e.g., by an epipolar rectification or other suitable mechanism, before being provided to the disparity estimator 120. The rectification may be performed by the stereoscopic image generator 102, by a component of the video depth controller 104, or by a component coupled between the stereoscopic image generator 102 and the video depth controller 104.

The disparity estimator 120 estimates disparities in the left stereoscopic image and the right stereoscopic image to generate an estimator signal 130 (step 804). For some embodiments, the disparity estimator 120 generates the estimator signal 130 by computing a first disparity field (such as left-to-right) and a second disparity field (such as right-to-left) and spatially decimating these computed disparity fields. The estimator signal 130 comprises the estimated disparities. For example, the estimator signal 130 may comprise the spatially decimated disparity fields.

The disparity processor 122 receives a depth control signal 112 generated by a user of the system 100 (step 806). Alternatively, the disparity processor 122 may receive a default depth control signal 112 if a user of the system 100 has not yet provided a depth control signal 112. The depth control signal 112 may be provided directly or indirectly to the disparity processor 122. For example, for some embodiments, the depth control signal 112 may be provided to any suitable component of the video depth controller 104 other than the disparity processor 122. The component receiving the depth control signal 112 may then provide the signal 112 to the disparity processor 122. For other embodiments, the depth control signal 112 may be provided by the stereoscopic image generator 102 to the disparity processor 122, to the disparity estimator 120, or to any other suitable component of the video depth controller 104. For still other embodiments, the depth control signal 112 may be provided by the display 106 to any suitable component of the video depth controller 104.

The disparity processor 122 processes the estimator signal 130 generated by the disparity estimator 120 based on the depth control signal 112 to generate a processor signal 132 (step 808). For some embodiments, the disparity processor 122 generates the processor signal 132 by selecting an adaptive 2D filter based on the local characteristics of the disparities region, applying the selected filter to the estimator signal 130, and up-scaling the disparity fields to the original image dimensions, after which the disparity processor 122 adjusts the disparities based on the depth control signal 112.

For some embodiments, the disparity processor 122 adjusts the disparities based on the depth control signal 112 by multiplying the disparities by a baseline scaling factor to provide a baseline adjustment and/or applying a horizontal translation offset to the disparities to provide a horizontal translation adjustment. For these embodiments, the depth control signal 112 comprises the baseline scaling factor and/or the horizontal translation offset.

The warping engine 124 warps the processor signal 132 based on a model to generate an adjusted stereoscopic image 114 (step 810). As described in more detail above, the warping engine 124 may warp the processor signal 132 by applying a transformation function to each point in a plurality of unwarped patches 502, 602 of the processor signal 132 to generate a plurality of warped patches 504, 604. For some embodiments, the transformation function may comprise a $2^{nd}$-degree polynomial in x and y or an affine model.

The warping engine 124 may then map points of the warped patches 704 to points of the unwarped patches 702 and, based on the neighbors 712a-d of the points in the unwarped patches 702, determine for each point 708 of the warped patch 704 a color/intensity value for filling in that point 708. For some embodiments, the filling process may be performed by means of a 2D interpolation scheme, such as bilinear or bicubic interpolation. For some embodiments, the process may be performed for a rectangle around the warped patch 704, such as the rectangle formed by the lines 714a-d in FIG. 7.

After the warping engine 124 generates the adjusted stereoscopic image 114, the warping engine 124 or other component of the video depth controller 104 provides the adjusted stereoscopic image 114 to a display 106 (step 812). Based on the perceived depth of the adjusted stereoscopic image 114 on the display 106, the user of the system 100 may modify the depth control signal 112, if desired.

In this way, a video depth controller 104 may be implemented that effectively enables a user to adjust the perceived depth of a stereoscopic image 110 through baseline adjustment and/or horizontal image translation. For some embodiments, the baseline adjustment range provided to the user for selection may be limited to a range that minimizes visible artifacts and distortions. For some embodiments, a range of 25% to 175% produces a relatively good depth adjustment-to-quality trade-off.

In addition, the video depth controller 104 may be implemented with a shared, low-cost disparity estimator 120 from a motion-compensated temporal interpolation frame rate conversion engine. The video depth controller 104 also avoids the use of a dedicated occlusion handling system on the stereoscopic images 110 since the video depth controller 104 does not need to identify occluded objects and process those objects. Furthermore, the video depth controller 104 may use a low-cost, model-based warping engine 124 that produces high-quality, adjusted stereoscopic images 114.

Although FIG. 8 illustrates one example of a method 800 for adjusting the perceived depth of stereoscopic images 110, various changes may be made to FIG. 8. For example, while shown as a series of steps, various steps in FIG. 8 could overlap, occur in parallel, occur in a different order, or occur multiple times.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses may be performed by more, fewer, or other components. The methods may include more, fewer, or other steps. Additionally, as described above, steps may be performed in any suitable order.

While the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), as well as user-recordable type mediums such as floppy disks, hard disk drives, compact disk read only memories (CD-ROMs), and digital versatile disks (DVDs).

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A system for adjusting the perceived depth of a stereoscopic image, comprising:
   a disparity estimator configured to receive a stereoscopic image having an initial perceived depth, to estimate disparities in the stereoscopic image, and to generate an estimator signal comprising the estimated disparities by computing a first disparity field and a second disparity field and spatially decimating the first and second disparity fields;
   a disparity processor configured to receive the estimator signal from the disparity estimator and a depth control signal generated based on a depth value input by a user which indicates a desired perceived depth and to generate a processor signal based on the estimator signal and the depth control signal by selecting an adaptive two-dimensional filter based on local characteristics of a disparities region, applying the selected filter to the estimator signal, and up-scaling the first and second disparity fields to dimensions corresponding to the stereoscopic image; and
   a warping engine configured to receive the processor signal and to generate an adjusted stereoscopic image by warping the processor signal based on a model.

2. The system of claim 1, wherein the disparity processor is configured to generate the processor signal by adjusting the estimated disparities based on the depth control signal.

3. The system of claim 1, wherein the depth control signal comprises a baseline scaling factor, and wherein the disparity processor is configured to generate the processor signal by multiplying the estimated disparities by the baseline scaling factor.

4. The system of claim 1, wherein the depth control signal comprises a horizontal translation offset, and wherein the disparity processor is configured to generate the processor signal by applying the horizontal translation offset to the estimated disparities.

5. The system of claim 1, wherein the depth control signal comprises a baseline scaling factor and a horizontal translation offset, and wherein the disparity processor is configured to generate the processor signal by multiplying the estimated disparities by the baseline scaling factor and applying the horizontal translation offset to the estimated disparities.

6. The system of claim 1, wherein the model comprises one of a $2^{nd}$-degree polynomials in x and y and an affine model, wherein the model further comprises a six-parameter model, and wherein the warping engine is configured to warp the processor signal by computing the six parameters for the model.

7. The system of claim 1, wherein the model comprises a three-parameter affine model, and wherein the warping engine is configured to warp the processor signal by computing the three parameters for the model.

8. The system of claim 1, wherein the warping engine is further configured to generate the adjusted stereoscopic image by, for each of a plurality of points in a warped patch, mapping the point in the warped patch onto a corresponding point in an unwarped patch.

9. The system of claim 8, wherein the warping engine is further configured to generate the adjusted stereoscopic image by, for each of the points in the warped patch, determining a color/intensity value for filling in the point of the warped patch by using a two-dimensional interpolation scheme.

10. The system of claim 9, wherein the warping engine is configured, for each of the points in the warped patch, to determine the color/intensity value for filling in the point of the warped patch based on a set of nearest integer neighbors for the corresponding point in the unwarped patch.

11. A method for adjusting the perceived depth of a stereoscopic image, comprising:
   estimating disparities in a stereoscopic image having an initial perceived depth by computing a first disparity field and a second disparity field and spatially decimating the first and second disparity fields;
   generating a processor signal based on the estimated disparities and based on a depth control signal generated based on a depth value input by a user which indicates a desired perceived depth, wherein the processor signal comprises a plurality of unwarped patches;
   wherein generating the processor signal comprises selecting an adaptive two-dimensional filter based on local characteristics of a disparities region, applying the selected filter to the estimated disparities, and up-scaling the first and second disparity fields to dimensions corresponding to the stereoscopic image;
   warping the processor signal based on a model to generate warped patches from the unwarped patches; and
   generating an adjusted stereoscopic image having the desired perceived depth based on the warped patches.

12. The method of claim 11, wherein the depth control signal comprises a baseline scaling factor, and wherein generating the processor signal comprises multiplying the estimated disparities by the baseline scaling factor.

13. The method of claim 11, wherein the depth control signal comprises a horizontal translation offset, and wherein generating the processor signal comprises applying the horizontal translation offset to the estimated disparities.

14. The method of claim 11, wherein the depth control signal comprises a baseline scaling factor and a horizontal translation offset, and wherein generating the processor signal comprises multiplying the estimated disparities by the baseline scaling factor and applying the horizontal translation offset to the estimated disparities.

15. The method of claim 11, wherein the model comprises a three-parameter affine model, and wherein warping the processor signal comprises computing the three parameters for the model.

16. The method of claim 11, wherein generating the adjusted stereoscopic image comprises:
   for each of a plurality of points in each warped patch, mapping the point in the warped patch onto a corresponding point in one of the unwarped patches; and for each of the points in the warped patch, determining a color/intensity value for filling in the point of the warped patch by using a two-dimensional interpolation scheme based on a set of nearest integer neighbors for the corresponding point in the unwarped patch.

17. A non-transitory computer-readable storage medium encoded with computer-executable instructions that, when executed, cause a video depth controller to perform the steps of:
estimating disparities in a stereoscopic image having an initial perceived depth by computing a first disparity field and a second disparity field and spatially decimating the first and second disparity fields;
generating a processor signal based on the estimated disparities and based on a depth control signal generated based on a depth value input by a user which indicates a desired perceived depth, wherein the processor signal comprises a plurality of unwarped patches;
wherein generating the processor signal comprises selecting an adaptive two-dimensional filter based on local characteristics of a disparities region, applying the selected filter to the estimated disparities, and up-scaling the first and second disparity fields to dimensions corresponding to the stereoscopic image;
warping the processor signal based on a model to generate warped patches from the unwarped patches; and
generating an adjusted stereoscopic image having the desired perceived depth based on the warped patches.

18. The non-transitory computer-readable storage medium of claim 17, further encoded with computer-executable instructions that, when executed, cause the video depth controller to perform the step of generating the processor signal by multiplying the estimated disparities by a baseline scaling factor, wherein the depth control signal comprises the baseline scaling factor.

19. The non-transitory computer-readable storage medium of claim 17, further encoded with computer-executable instructions that, when executed, cause the video depth controller to perform the step of generating the processor signal by applying a horizontal translation offset to the estimated disparities, wherein the depth control signal comprises the horizontal translation offset.

20. The computer-readable storage medium of claim 17, further encoded with computer-executable instructions that, when executed, cause the video depth controller to perform the step of generating the processor signal by multiplying the estimated disparities by a baseline scaling factor and applying a horizontal translation offset to the estimated disparities, wherein the depth control signal comprises the baseline scaling factor and the horizontal translation offset.

21. The non-transitory computer-readable storage medium of claim 17, further encoded with computer-executable instructions that, when executed, cause the video depth controller to perform the step of generating the adjusted stereoscopic image by:
for each of a plurality of points in each warped patch, mapping the point in the warped patch onto a corresponding point in one of the unwarped patches; and
for each of the points in the warped patch, determining a color/intensity value for filling in the point of the warped patch by using a two-dimensional interpolation scheme based on a set of nearest integer neighbors for the corresponding point in the unwarped patch.

* * * * *